(12) United States Patent
Ebisuzaki et al.

(10) Patent No.: US 10,446,849 B2
(45) Date of Patent: Oct. 15, 2019

(54) NONAQUEOUS ELECTROLYTE SECONDARY BATTERY

(71) Applicant: TOYOTA JIDOSHA KABUSHIKI KAISHA, Toyota-shi, Aichi (JP)

(72) Inventors: Hideyo Ebisuzaki, Toyota (JP); Masaru Ishii, Miyoshi (JP); Hiroshi Hamaguchi, Toyota (JP); Toru Nakai, Kiyosu (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/589,546

(22) Filed: Jan. 5, 2015

(65) Prior Publication Data

US 2015/0194676 A1  Jul. 9, 2015

(30) Foreign Application Priority Data

Jan. 8, 2014 (JP) ................... 2014-001961

(51) Int. Cl.
*H01M 4/62* (2006.01)
*H01M 10/0566* (2010.01)
(Continued)

(52) U.S. Cl.
CPC ............. *H01M 4/62* (2013.01); *H01M 2/345* (2013.01); *H01M 10/4235* (2013.01);
(Continued)

(58) Field of Classification Search
CPC .......... H01M 4/62; H01M 2/345; H01M 2/30; H01M 4/625; H01M 4/131;
(Continued)

(56) References Cited

U.S. PATENT DOCUMENTS

| 4,888,255 A | 12/1989 | Yoshimitsu et al. |
| 5,776,627 A * | 7/1998 | Mao ............ H01M 10/4235 |
| | | 429/324 |
| 6,156,459 A * | 12/2000 | Negoro ........... H01M 10/0567 |
| | | 429/231.8 |

(Continued)

FOREIGN PATENT DOCUMENTS

| DE | 69614809 T2 | 4/2002 |
| JP | 64-60959 A | 3/1989 |

(Continued)

*Primary Examiner* — Miriam Stagg
*Assistant Examiner* — Brent C Thomas
(74) *Attorney, Agent, or Firm* — Sughrue Mion, PLLC (57) ABSTRACT

Provided is a nonaqueous electrolyte secondary battery that allows a current cutoff mechanism to operate appropriately while maintaining high battery performance. The nonaqueous electrolyte secondary battery according to the present invention includes: a battery assembly provided with a positive electrode having a positive electrode active material layer retained on a positive electrode current collector, a negative electrode and a separator; a battery case housing the electrode assembly together with a nonaqueous electrolyte; and a current cutoff mechanism. The positive electrode active material layer includes a positive electrode active material and a conductive material. A compound containing a saturated cyclic hydrocarbon group is retained in at least a portion of the conductive material. The content of the compound containing a saturated cyclic hydrocarbon group is 0.5% by mass or more based on a value of 100% by mass for the total solid content of the positive electrode active material layer.

7 Claims, 6 Drawing Sheets

(51) Int. Cl.
*H01M 4/131* (2010.01)
*H01M 10/0525* (2010.01)
*H01M 2/34* (2006.01)
*H01M 2/30* (2006.01)
*H01M 10/42* (2006.01)
*H01M 4/02* (2006.01)

(52) U.S. Cl.
CPC .............. *H01M 2/30* (2013.01); *H01M 4/131* (2013.01); *H01M 4/625* (2013.01); *H01M 10/0525* (2013.01); *H01M 10/0566* (2013.01); *H01M 2004/028* (2013.01); *H01M 2200/20* (2013.01); *H01M 2300/0025* (2013.01)

(58) Field of Classification Search
CPC ......... H01M 10/0525; H01M 10/0566; H01M 2200/20; H01M 2004/028
See application file for complete search history.

(56) References Cited

U.S. PATENT DOCUMENTS

| | | | |
|---|---|---|---|
| 2006/0166102 A1* | 7/2006 | Fujiwara | H01M 10/0525 429/326 |
| 2008/0318124 A1* | 12/2008 | Horiuchi | H01M 4/13 429/199 |
| 2011/0183199 A1* | 7/2011 | Abe | C07C 309/66 429/188 |
| 2012/0276455 A1* | 11/2012 | Nishimura | H01M 4/621 429/232 |
| 2016/0087315 A1 | 3/2016 | Oyama | |

FOREIGN PATENT DOCUMENTS

| | | |
|---|---|---|
| JP | 2013-152810 A | 8/2013 |
| JP | 2013-157139 A | 8/2013 |
| WO | 2013-108396 A1 | 7/2013 |

* cited by examiner

NONAQUEOUS ELECTROLYTE SECONDARY BATTERY

BACKGROUND OF THE INVENTION

1. Field of the Invention

The present invention relates to a secondary battery provided with a nonaqueous electrolyte (nonaqueous electrolyte secondary battery).

Furthermore, the present international application claims priority on the basis of Japanese Patent Application No. 2014-001961 filed on Jan. 8, 2014, the contents of which are incorporated herein by reference.

2. Description of the Related Art

Lithium ion secondary batteries and other nonaqueous electrolyte secondary batteries are becoming increasingly important as vehicle-mounted power supplies and power supplies of personal computers, portable terminals and the like. In particular, lithium ion secondary batteries are preferably used as high output, vehicle-mounted power supplies since they are lightweight and allow the obtaining of high energy density (see, for example, Japanese Patent Application Laid-open No. 2013-157139). When such nonaqueous electrolyte secondary batteries are overcharged, an excessive amount of charge carrier is released from the positive electrode, while an excessive amount of charge carrier is inserted into the negative electrode. Consequently, the positive electrode and negative electrode become thermally unstable. When the positive electrode and negative electrode become thermally unstable, the organic solvent of the electrolyte ultimately breaks down resulting in the occurrence of an exothermic reaction that impairs battery stability.

In response to this problem, a nonaqueous electrolyte secondary battery has been disclosed that is provided with a current cutoff mechanism in the battery case thereof that interrupts charging when, for example, gas pressure within the battery reaches a prescribed pressure or higher, wherein a gas generator is added that generates gas in the electrolyte when the battery reaches a predetermined overcharged state. Cyclohexylbenzene (CHB) or biphenyl (BP), for example, is used for the gas generator (see, for example, Japanese Patent Application Laid-open No. 2013-157139). CHB and BP generate hydrogen gas as a result of being activated by a polymerization reaction during overcharging. As a result, pressure within the battery case increases, the current cutoff mechanism is activated and overcharge current is interrupted.

SUMMARY OF THE INVENTION

However, in order to allow the current cutoff mechanism to operate efficiently, it is effective to increase the amount of the above-mentioned gas generator added. However, since the above-mentioned gas generator acts as a resistance component of the battery, when the amount of gas generator added increases, it can cause a decrease in battery performance. On the other hand, if the amount of gas generator added is reduced to maintain a high level of battery performance, the generation of gas during overcharging is diminished, thereby potentially causing a delay in activation of the current cutoff mechanism. In this type of conventional configuration, it was difficult to realize both the securing of an adequate amount of generated gas and the maintaining of battery performance. The present invention solves the above-mentioned problems.

The nonaqueous electrolyte secondary battery provided by the present invention includes: an electrode assembly provided with a positive electrode in which a positive electrode active material layer is retained on a positive electrode current collector, a negative electrode in which a negative electrode active material layer is retained on a negative electrode current collector, and a separator interposed between the positive electrode and the negative electrode; a battery case housing the electrode assembly together with a nonaqueous electrolyte; an external terminal provided in the battery case and connected to the electrode assembly; and a current cutoff mechanism interrupting the electrical connection between the electrode assembly and the external terminal when internal pressure of the battery case reaches a predetermined pressure or higher. The above-mentioned positive electrode active material layer at least includes a positive electrode active material and a conductive material. A compound containing a saturated cyclic hydrocarbon group is retained (loaded) in at least a portion of the above-mentioned conductive material. The content of the above-mentioned compound is 0.5% by mass or more based on a value of 100% by mass for the total solid content of the above-mentioned positive electrode active material layer. In a preferable mode thereof, the above-mentioned compound is composed so as to allow protons to detach from the above-mentioned saturated cyclic hydrocarbon group when the voltage reaches a predetermined voltage or higher. According to this configuration, a secondary battery can be provided that allows the current cutoff mechanism to operate appropriately during overcharging while maintaining favorable battery performance.

The content of the above-mentioned compound is about 0.5% by mass or more (and preferably 1% by mass or more) based on a value of 100% by mass for the total solid content of the above-mentioned positive electrode active material layer. If the content of the above-mentioned compound is excessively low, the amount of gas generated during overcharging is insufficient, which can cause a delay in operation of the current cutoff mechanism. On the other hand, if the content of the above-mentioned compound is excessively high, the function of a conductive material 58 is impaired by the compound, thereby resulting in a possible decrease in battery performance (in terms of battery capacity, for example). From the viewpoint of allowing the function of the conductive material to be suitably demonstrated, the content of the above-mentioned compound is about 4% by mass or less (and preferably 2% by mass or less).

In a preferable mode of the nonaqueous electrolyte secondary battery disclosed herein, the aforementioned saturated cyclic hydrocarbon group is a cyclohexyl group. Since a cyclohexyl group allows the detachment of a proton ($H^+$) when the voltage reaches a predetermined voltage or higher, it can be preferably used as a compound that is suited to the object of the present invention. Here, an example of a compound containing a cyclohexyl group is cyclohexylbenzene (CHB).

In a preferable mode of the nonaqueous electrolyte secondary battery disclosed herein, the above-mentioned nonaqueous electrolyte does not contain a gas generator that generates gas when the voltage reaches a predetermined voltage or higher. If a gas generator is contained in the electrolyte, the gas generator inhibits the phoretic diffusion of the charge carrier (lithium ions in the case of a lithium ion secondary battery) and anions present in the electrolyte, thereby potentially causing a decrease in battery performance. In contrast, according to the configuration of the present invention, since the above-mentioned compound functioning as a gas generator is retained on a conductive material, an adequate amount of gas can be secured during overcharging even if a gas generator is not contained in the electrolyte. Thus, the current cutoff mechanism can be allowed to operate appropriately during overcharging without causing a decrease in battery performance.

DESCRIPTION OF THE PREFERRED EMBODIMENTS

The following provides an explanation of preferred embodiments of the present invention. Furthermore, those matters required for carrying out the present invention that are not specifically mentioned in the present description can be understood to be design matters for a person with ordinary skill in the art based on the conventional art in the relevant field. The present invention can be carried out based on the contents described in the present description and common general technical knowledge in the relevant field. Furthermore, in the present description, the term "secondary battery" refers to all electrical storage devices that can be repeatedly charged and discharged, and includes so-called storage batteries such as lithium ion secondary batteries as well as electrical storage elements such as electric double layer capacitors. In addition, a "nonaqueous electrolyte secondary battery" refers to a battery provided with a nonaqueous electrolyte (and typically, an electrolyte that contains a supporting salt (supporting electrolyte) in a nonaqueous solvent). In addition, a "lithium ion secondary battery" refers to a secondary battery that uses lithium ions for the electrolyte ions, and is charged and discharged by the migration of lithium ions between positive and negative electrodes. In addition, an electrode active material refers to a material that is able to reversibly occlude and release chemical species (lithium ions in the case of a lithium ion secondary battery).

The following provides an explanation of a nonaqueous electrolyte secondary battery according to one embodiment of the present invention based on the drawings. Furthermore, the same reference symbols are suitably used to represent those members and sites that demonstrate the same action. In addition, the drawings are intended to be schematic depictions and do not necessarily reflect actual objects. The drawings are also intended to be exemplary and do not limit the present invention unless specifically indicated otherwise. Although the following provides an explanation of embodiments of the present invention by using as an example the case of applying the present invention to a lithium ion secondary battery, this is not intended to limit the application range of the present invention.

Figure 1:
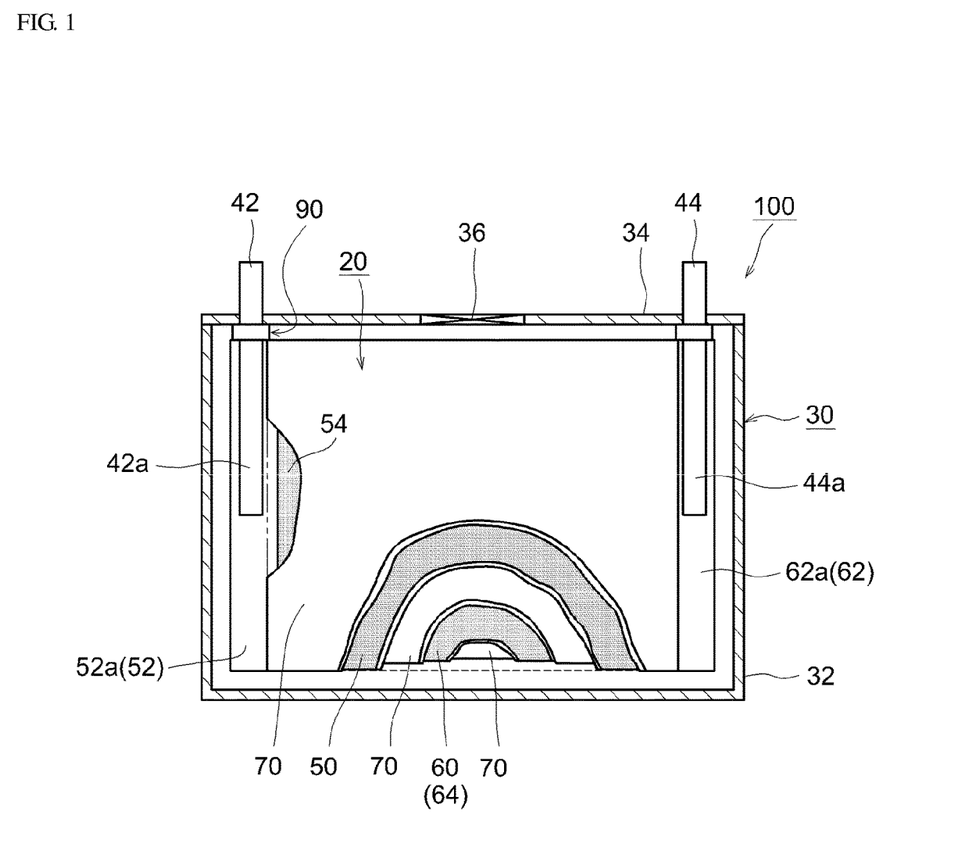
FIG. 1 is a drawing showing an example of the structure of a lithium ion secondary battery according to an embodiment.
Figure 2:
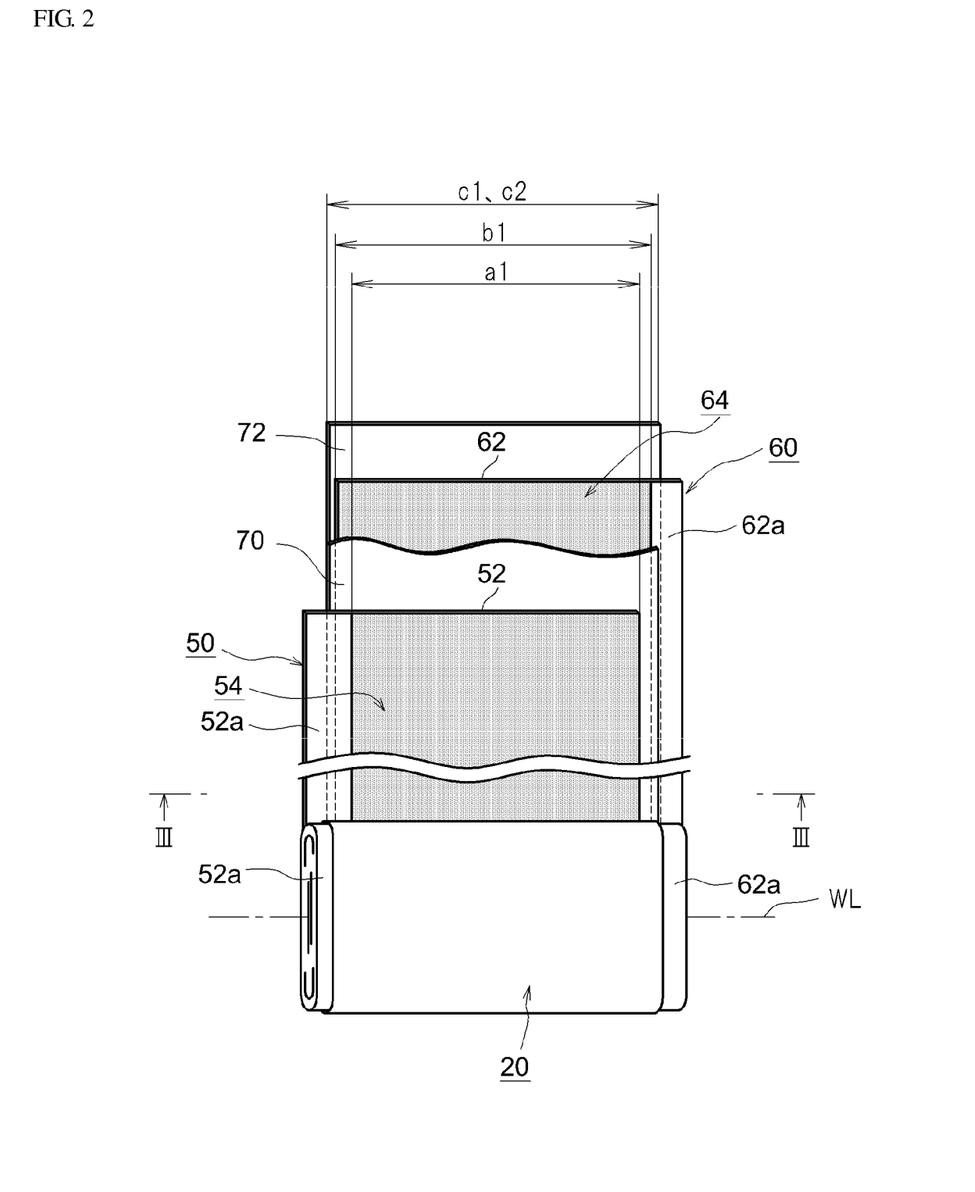
FIG. 2 is a drawing showing a wound electrode assembly according to an embodiment.
Figure 3:
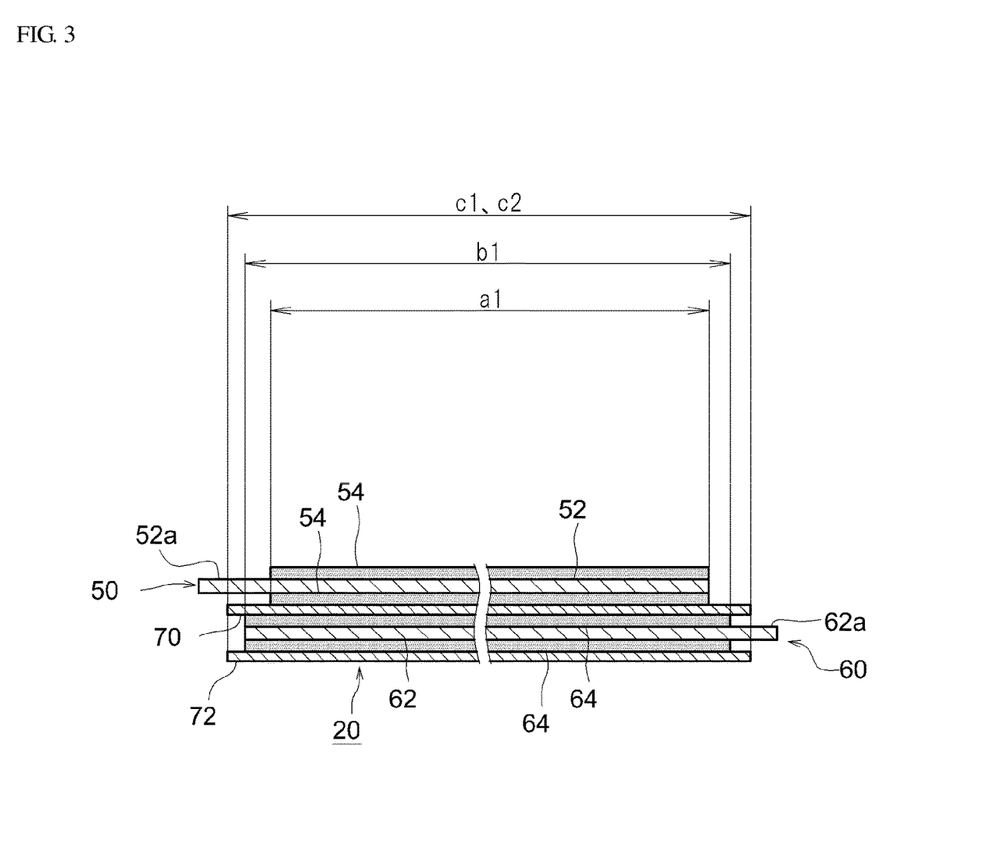
FIG. 3 is a cross-sectional view showing a cross-section taken along line III-III in FIG. 2.

FIG. 1 indicates a lithium ion secondary battery 100 according to one embodiment of the present invention. As shown in FIG. 1, this lithium ion secondary battery 100 is provided with a wound electrode assembly 20 and a battery case 30. FIG. 2 is a drawing showing the wound electrode assembly 20. FIG. 3 is a cross-sectional view taken along line III-III in FIG. 2. In the lithium ion secondary battery 100 according to one embodiment of the present invention as shown in FIG. 1 and FIG. 2, the flat-shaped wound electrode assembly 20 is housed in the flat, rectangular battery case 30 (namely, an outer container) together with a liquid electrolyte (electrolyte solution) not shown.

The battery case 30 is composed of a box-shaped (namely, the shape of a bottomed rectangular parallelepiped) case body 32 having in one end thereof an opening (corresponding to the upper end when the battery is in the normal usage state) and a sealing plate (cover) 34 attached to the opening that is composed of a rectangular plate member that covers the opening. An example of the material of the battery case 30 is aluminum. As shown in FIG. 1, a positive electrode terminal 42 and a negative electrode terminal 44 for making external connections are formed in the sealing plate 34. A thin-walled safety valve 36 is formed between both of the terminals 42 and 44 of the sealing plate 34 that is composed so as to release pressure within the battery case 30 in the case it has risen to a prescribed level or higher.

The wound electrode assembly 20 is provided with a long, sheet-shaped positive electrode (positive electrode sheet 50), a long, sheet-shaped negative electrode (negative electrode sheet 60) similar to the positive electrode sheet 50, and a total of two, long, sheet-shaped separators (separators 70 and 72).

The positive electrode sheet 50 is provided with a band-shaped positive electrode current collector 52 and a positive electrode active material layer 54. Band-shaped aluminum foil having a width of about 15 μm, for example, is used for the positive electrode current collector 52. An uncoated portion 52a is provided along one edge in the direction of width of the positive electrode current collector 52. In the example shown in the drawing, the positive electrode active material layer 54 is retained on both sides of the positive electrode current collector 52 with the exception of the uncoated portion 52a provided on the positive electrode current collector 52. The positive electrode active material layer 54 contains a positive electrode active material, a conductive material and a binder.

A substance used as a positive electrode active material of a lithium ion secondary battery can be used for the positive electrode active material. Examples of positive electrode active materials include lithium transition metal oxides such as lithium nickel-cobalt-manganese oxide ($LiNiCoMnO_2$). For example, a conductive material can be mixed into the positive electrode active material. The conductive material will be subsequently described.

In addition, a binder such as polyvinylidene fluoride (PVdF), styrene-butadiene rubber (SBR) or carboxymethyl cellulose (CMC) can be added in addition to the positive electrode active material and conductive material. A composition for forming the positive electrode active material layer (paste) can be prepared by dispersing these in a suitable dispersion medium and kneading. The positive electrode active material layer 54 is formed by coating this composition for forming the positive electrode active material layer onto the positive electrode current collector 52 followed by drying and pressing to a predetermined thickness.

As shown in FIG. 2, the negative electrode sheet 60 is provided with a band-shaped negative electrode current collector 62 and a negative electrode active material layer 64. A band-shaped copper foil having a thickness of about 10 μm is used for the negative electrode current collector 62. An uncoated portion 62a is provided along one edge in the direction of width of the negative electrode current collector 62. The negative electrode active material layer 64 is retained on both sides of the negative electrode current collector 62 with the exception of the uncoated portion 62a provided on the negative electrode current collector 62. The negative electrode active material layer 64 contains, for example, a negative electrode active material, a thickener and a binder.

One or two or more substances conventionally used in lithium ion secondary batteries can be used for the negative electrode active material without any particular limitations. Preferable examples thereof include carbon-based materials such as graphite carbon. Similar to the positive electrode, a negative electrode admixture (paste) can be prepared by dispersing the negative electrode active material in a suitable dispersion medium along with a binder such as PVDF, SBR, PTFE or CMC and kneading. This negative electrode active material layer 64 is coated onto the negative electrode current collector 62 followed by drying and pressing to a predetermined thickness.

The separators 70 and 72 are members that separate the positive electrode sheet 50 and the negative electrode sheet 60. In this example, the separators 70 and 72 are composed of a band-like base material of a prescribed width having a plurality of small holes. A sheet material having a single-layer structure composed of a porous polyolefin-based resin (such as a polyethylene single-layer structure), or a sheet material having a laminated structure (such as a three-layered structure consisting of polypropylene, polyethylene and polypropylene), for example, can be used for the base material. As shown in FIG. 2 and FIG. 3, a width b1 of the negative electrode active material layer 64 is wider than a width a1 of the positive electrode active material layer 54. In addition, widths c1 and c2 of the separators 70 and 72 are wider than the width b1 of the negative electrode active material layer 64 (c1,c2>b1>a1).

The wound electrode assembly 20 is obtained by superimposing the positive electrode sheet 50 and the negative electrode sheet 60 with the separators 70 and 72 interposed there between such that the positive electrode active material layer 54 and the negative electrode active material layer 64 are in mutual opposition. Moreover, the negative electrode current collector 62 and the positive electrode current collector 52 are superimposed so that their mutual uncoated portions 52a and 62a protrude toward the opposite side in the direction of width of the wound electrode assembly 20. The superimposed sheet materials (such as the positive electrode sheet 50) are wound about a winding line WL oriented in the direction of width.

The wound electrode assembly 20 is attached to the electrode terminals 42 and 44 that are attached to the battery case 30 (to the cover 34 in this example). The wound electrode assembly 20 is housed in the battery case 30 in a state in which it is pushed and bent into a flat shape in a direction perpendicular to the winding line. In addition, the wound electrode assembly 20 is such that the uncoated portion 52a of the positive electrode sheet 50 and the uncoated portion 62a of the negative electrode sheet 60 protrude toward mutually opposite sides in the direction of width of the separators 70 and 72. One of the electrode terminals 42 is fixed to the uncoated portion 52a of the positive electrode current collector 52, while the other electrode terminal 44 is fixed to the uncoated portion 62a of the negative electrode current collector 62. The wound electrode assembly 20 is housed in a flat space within the case body 32. The case body 32 is closed with the cover 34 after the wound electrode assembly 20 has been housed therein.

A nonaqueous electrolyte similar to a nonaqueous electrolyte conventionally used in lithium ion secondary batteries can be used for the electrolyte (nonaqueous electrolyte) without any particular limitations. The nonaqueous electrolyte typically has a composition obtained by containing a supporting salt in a suitable nonaqueous solvent. Examples of the above-mentioned nonaqueous solvent that can be used include one or two or more nonaqueous solvents selected from the group including, for example, ethylene carbonate, propylene carbonate, dimethyl carbonate, diethyl carbonate, ethylmethyl carbonate, 1,2-dimethoxyethane, 1,2-diethoxyethane, tetrahydrofuran and 1,3-dioxolane. In addition, examples of the above-mentioned supporting salt that can be used include lithium salts such as $LiPF_6$, $LiBF_4$, $LiAsF_6$, $LiCF_3SO_3$, $LiC_4F_9SO_3$, $LiN(CF_3SO_2)_2$ or $LiC(CF_3SO_2)_3$. One example thereof is a nonaqueous electrolyte obtained by containing $LiPF_6$ at a concentration of about 1 mol/L in a mixed solvent of ethylene carbonate and diethyl carbonate (at a mass ratio of, for example, 1:1). In this embodiment, the nonaqueous electrolyte does not contain a gas generator (such as cyclohexylbenzene (CHB) or biphenyl (BP)) that generates gas when the voltage has reached a predetermined voltage or higher.

In addition, this lithium ion secondary battery 100 is provided with a current cutoff mechanism 90. The current cutoff mechanism 90 is a mechanism that interrupts the current path in the case pressure within the battery case has become abnormally high. In this embodiment, the current cutoff mechanism 90 is composed on the inside of the positive electrode terminal 42 so as to interrupt the conduction path of battery current in the positive electrode as shown in FIG. 1.

Figure 4:
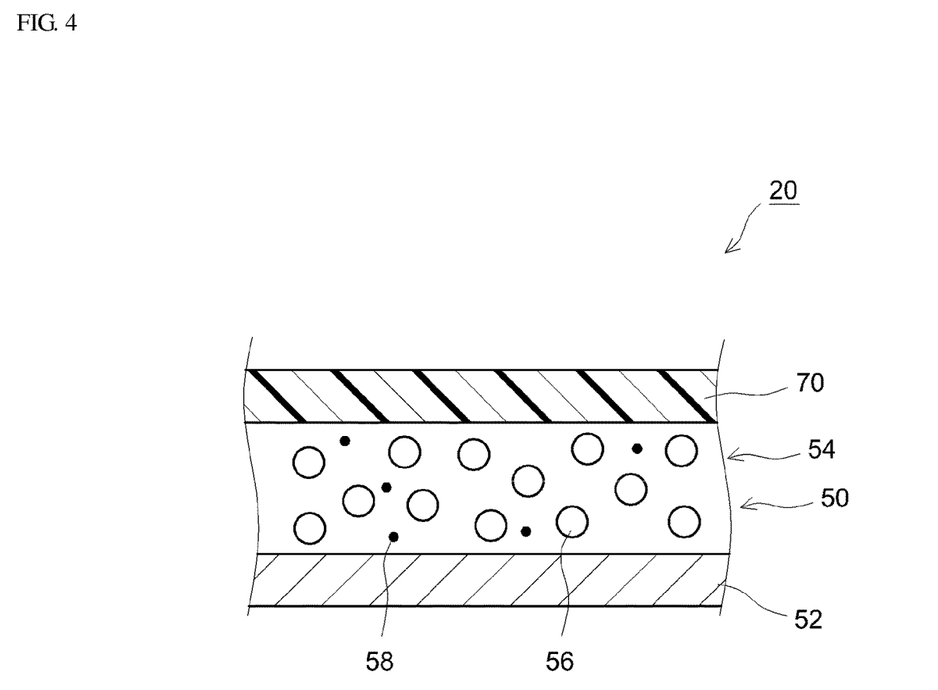
FIG. 4 is a schematic diagram showing a portion of a cross-section obtained by sectioning a wound electrode assembly in the radial direction.

The following provides a more detailed explanation of this lithium ion secondary battery 100. FIG. 4 schematically shows a cross-section obtained by sectioning the positive electrode sheet 50 and the separator 70 superimposed in the wound electrode assembly 20 in the direction of the winding line (such as in the direction of width of the positive electrode sheet 50).

As shown in FIG. 2, the positive electrode sheet 50 is provided with the positive electrode current collector 52 and the positive electrode active material layer 54 retained on the positive electrode current collector 52. The positive electrode active material layer 54 contains a positive electrode active material 56, the conductive material 58 and a binder (not shown). As was previously described, the conductive material 58 is composed of a powdered carbon material (such as AB). A compound containing a saturated cyclic hydrocarbon group is retained (chemically immobilized) on at least a portion of the conductive material 58. In other words, the surface of the conductive material 58 is chemically modified by the compound containing a saturated cyclic hydrocarbon group.

There are no particular limitations on the compound containing a saturated cyclic hydrocarbon group introduced into the surface of the conductive material 58, and other molecular structures thereof, within the range over which the effects of the present application can be demonstrated provided it is a compound that at least has a saturated cyclic hydrocarbon group, and may have any functional groups, binding sites, halogen atoms or metal atoms and the like. In addition, the compound is preferably composed so as to allow a proton to detach from the saturated cyclic hydrocarbon group upon being oxidized when the voltage reaches a predetermined voltage or higher. Examples of such saturated cyclic hydrocarbon groups include cycloalkyl groups having, for example, a monocyclic, bicyclic, tricyclic or tetracyclic structure consisting of 5 to 10 (and preferably 6 to 8) carbon atoms. For example, examples of monocycloalkyl groups include a cyclopentyl group, cyclohexyl group, cycloheptanyl group, cyclooctanyl group, cyclononanyl group and cyclodecanyl group. In addition, compounds in which one or two or more of these saturated cyclic hydrocarbon groups are bound directly or indirectly to an aromatic ring (including a heteroaromatic ring) are preferable. The compound may also be a compound in which hydrogen atoms in the aromatic ring (and typically a benzene ring) that are bound to atoms that compose the aromatic ring (such as carbon atoms) are respectively and independently substituted with, for example, an aliphatic alkyl group (linear or branched having 1 to 10 carbon atoms), an alicyclic alkyl group (saturated or unsaturated having 1 to 10 carbon atoms), an oxygen atom (which can also be an hydroxyl group (OH)) or a halogen atom (such as F, Cl or Br).

Figure 5:
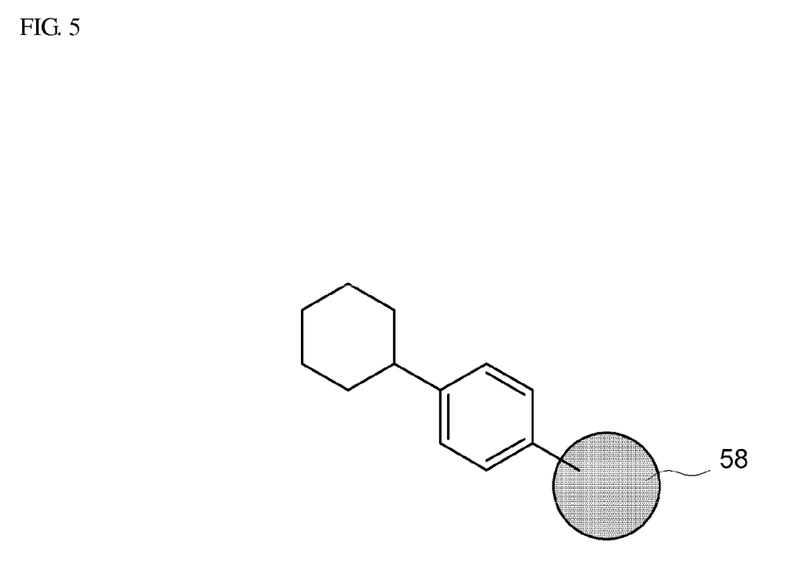
FIG. 5 is a drawing showing an example of a conductive material retaining CHB.

A specific example of a more preferable compound having a saturated cyclic hydrocarbon group in the technology disclosed herein is a compound in which the above-mentioned cycloalkyl group is directly bound to a benzene ring (cycloalkylbenzene). This cycloalkylbenzene has a monocyclic cycloalkyl group having 5 to 10 (and preferably 6 to 8) carbon atoms. Particularly preferable examples include cyclohexylbenzene (CHB), cycloheptanybenzene and cyclooctanylbenzene. Among these, CHB is used preferably. Here, FIG. 5 schematically shows the conductive material 58 retaining (loaded with) CHB. In the example shown in FIG. 5, the surface of the conductive material 58 is chemically modified by CHB.

In the lithium ion secondary battery 100 employing this configuration, a compound containing a saturated cyclic hydrocarbon group (such as CHB) is retained (loaded) on the conductive material 58 as was previously described. According to this configuration, since the compound containing a saturated cyclic hydrocarbon group is normally retained (namely, during the time the battery is used within the normal charging and discharging range) on the conductive material 58, problems that can occur in the case of the compound having been dispersed in the electrolyte (such as a decrease in output characteristics due to the compound inhibiting the phoretic diffusion of lithium ions and anions in the electrolyte) can be avoided. In addition, pressure within the battery case rises rapidly due to the generation of gas derived from the above-mentioned compound when the battery is overcharged. As a result, the current cutoff mechanism 90 can be operated at the proper timing. Namely, according to the present configuration, the lithium ion secondary battery 100 can be provided that demonstrates high performance (in terms of, for example, low resistance) and superior stability.

Figure 6:
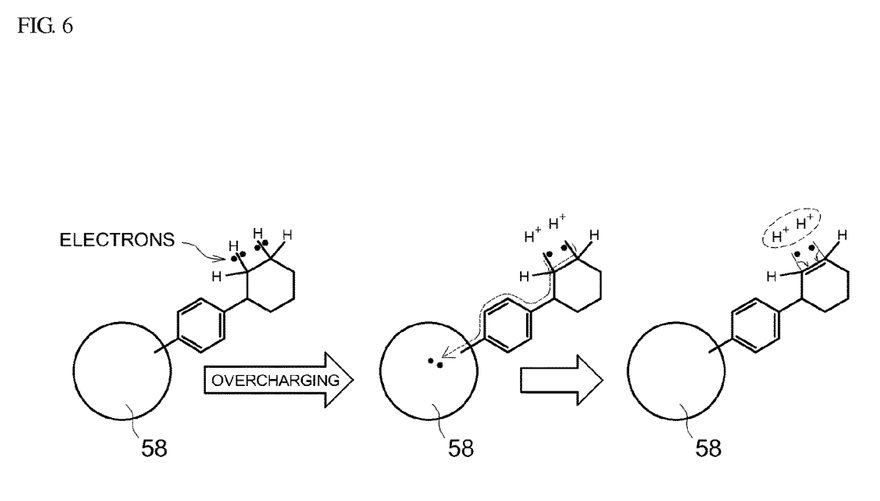
FIG. 6 is a drawing showing an example of a conductive material retaining CHB.

Furthermore, according to the present configuration, when the voltage reaches a predetermined voltage or higher (overcharged state), although gas can be generated that originates in the above-mentioned compound containing a saturated cyclic hydrocarbon group, this effect is thought to be realized in association with the detachment of a proton ($H^+$) from the saturated cyclic hydrocarbon group contained in the compound. As an example thereof, in the case the above-mentioned compound is cyclohexylbenzene (CHB), as shown in FIG. 6, although CHB is normally retained on the conductive material 58, when the voltage reaches a predetermined voltage or higher (overcharged state), electrons are extracted from CHB through the conductive material 58 and together therewith, $H^+$ are removed from CHB resulting in the formation of a double bond. The $H^+$ that have detached from CHB migrate to the negative electrode where they are reduced, and this is thought to result in the generation of hydrogen gas at the negative electrode. However, the present invention can be easily carried out based on the information disclosed herein (such as the composition of the compound containing a saturated cyclic hydrocarbon group or the conductive material). Thus, the mechanism of action of the compound containing a saturated cyclic hydrocarbon group of the present invention as related to the generation of gas during overcharging is not required to understand and carry out the present invention. The description relating to the above-mentioned mechanism of action is merely intended to indicate one example thereof, and it is not intended to limit the present invention to the mechanism of action explained herein.

Although clear from the above-mentioned mechanism of action, use of the modified conductive material 58 disclosed herein makes it possible to ensure an adequate amount of gas during overcharging even if a gas generator such as CHB or BP is not contained in the electrolyte. Consequently, during the time the battery is used within the normal charging and discharging range, detrimental effects attributable to containing a gas generator such as CHB or PB in the electrolyte (such as a decrease in output characteristics due to inhibition of the phoretic diffusion of lithium ions and anions in the electrolyte) are avoided while allowing appropriate operation of the current cutoff mechanism 90 during overcharging.

The content of the above-mentioned compound having a saturated cyclic hydrocarbon group in the positive electrode active material layer used in the lithium ion secondary battery disclosed herein is suitably about 0.5% by mass or more, preferably 0.8% by mass or more and particularly preferably 1% by mass or more based on a value of 100% by mass for the total solid content of the positive electrode active material layer. If the content of the above-mentioned compound is excessively low, the amount of gas generated during overcharging is insufficient, which can cause a delay in the operation of the current cutoff mechanism 90 (FIG. 1). On the other hand, if the content of the above-mentioned compound is excessively high, the function of the conductive material 58 is impaired by the compound, thereby potentially causing a decrease in battery performance (in terms of, for example, battery capacity). From the viewpoint of allowing the function of the conductive material to be suitably demonstrated, the content of the above-mentioned compound is suitably about 8% by mass or less, preferably 4% by mass or less and particularly preferably 2% by mass or less.

Various types of materials commonly known to be able to be used as conductive materials of lithium ion secondary batteries and which are capable of being modified by the above-mentioned compound containing a saturated cyclic hydrocarbon group can be used for the conductive material (and typically in particulate form) used in the lithium ion secondary battery disclosed herein without any particular limitations. Examples of conductive materials that can be used include carbon black such as acetylene black (AB), Ketjen black, furnace black or thermal black, and other powdered carbon materials (such as graphite). AB is used particularly preferably. Although there are no particular limitations thereon, the mean particle diameter of the conductive material is about 100 nm to 1000 nm. Although there are also no particular limitations on the amount of conductive material present throughout the positive electrode active material layer (excluding the mass of the above-mentioned compound retained on the conductive material), it is normally about 0.5% by mass to 15% by mass (and preferably 1% by mass to 10% by mass and particularly preferably 2% by mass to 5% by mass).

Although there are no particular limitations on the method (chemical modification treatment) used to retain the above-mentioned compound on the surface of the above-mentioned conductive material, a method consisting of mixing an unmodified conductive material with a raw material of the above-mentioned compound followed by heating and stirring, for example, can be preferably employed. For example, in the case of obtaining a conductive material by modifying the surface thereof with CHB, the conductive material is introduced into a reaction vessel equipped with a Liebig condenser and stirrer, and the inside of the reaction vessel is deoxygenated and replaced with argon followed by adding O-dichloromethane, tetrahydrofuran (THF) and p-cyclohexylaniline and stirring at room temperature. Next, isoamyl nitrite is added to the reaction product followed by heating and stirring. After allowing to cool on standing, filtering and washing the filtrate with acetone, the filtrate is dried to obtain a modified conductive material in which the surface thereof is modified with the above-mentioned CHB. In this production method, chemical modification of a conductive material using CHB can be carried out easily and efficiently, and the conductive material chemically modified by CHB can be formed with favorable productivity. Furthermore, the amount of the above-mentioned compound (such as CHB) retained on the conductive material is determined by thermal analysis. For example, the above-mentioned amount can be determined from the weight change when an unmodified conductive material and modified conductive material are scanned from 100° C. to 500° C. in the presence of flowing nitrogen using a thermogravimetry-differential thermal analysis (TG-DTA). In other words, the amount of the weight gain in the modified conductive material can be taken to be the amount of the above-mentioned compound.

Test Examples

In the test examples, evaluation cells (lithium ion secondary batteries) were constructed using a modified conductive material chemically modified by CHB followed by carrying out an overcharge test on the batteries and evaluating the discharge characteristics thereof. The following provides a detailed description of the method used.

The modified conductive material of the evaluation cell was fabricated in the manner described below. First, a conductive material in the form of acetylene black (DENKI KAGAKU KOGYO KABUSHIKI KAISHA.) was introduced into a reaction vessel equipped with a Liebig condenser and stirrer, and after deoxygenating and replacing the atmosphere inside the reaction vessel with argon, O-dichloromethane, tetrahydrofuran (THF, Aldrich Inc.) and p-cyclohexylaniline (Wako Pure Chemical Industries, Ltd.) were added and stirred at room temperature followed by adding isoamyl nitrite to the reaction product with a syringe and heating. After allowing to cool on standing, the reaction product was filtered and the filtrate was washed with acetone followed by drying to obtain a modified conductive material having CHB retained thereon.

The positive electrode of the evaluation cells was fabricated in the manner indicated below. First, a positive electrode active material in the form of $LiNi_{1/3}CO_{1/3}Mn_{1/3}O_2$ powder, the above-mentioned modified conductive material and a binder in the form of PVdF were mixed in NMP at a mass ratio thereof of 93:4:3 to prepare a composition for a positive electrode active material layer. This composition for a positive electrode active material layer was coated in a band-shape on both sides of a long, sheet-shaped aluminum foil (positive electrode current collector) and dried to fabricate a positive electrode sheet having a positive electrode active material layer provided on both sides of a positive electrode current collector.

The negative electrode of the evaluation cells was fabricated in the manner indicated below. First, a negative electrode active material in the form of amorphous coated graphite, a binder in the form of SBR and a thickener in the form of CMC were dispersed in water at a mass ratio thereof of 98:1:1 to prepare a composition for a negative electrode active material layer. This composition for a negative electrode active material layer was coated onto both sides of a long, sheet-like copper foil (negative electrode current collector) to fabricate a negative electrode sheet having a negative electrode active material layer provided on both sides of a negative electrode current collector.

A porous polyethylene (PE) sheet was used for the separators of the evaluation cells. A nonaqueous electrolyte obtained by containing a supporting salt in the form of $LiPF_6$ at a concentration of about 1 mol/liter in a mixed solvent containing ethylene carbonate (EC), dimethyl carbonate (DMC) and ethylmethyl carbonate (EMC) at a volume ratio of 3:3:4 was used for the nonaqueous electrolyte of the evaluation cells.

A wound electrode assembly was fabricated by winding the positive electrode sheet and the negative electrode sheet with two separator sheets interposed there between. The wound electrode assembly obtained in this manner was then housed in a cylindrical battery container together with the nonaqueous electrolyte followed by sealing the opening of the battery container to be airtight. The evaluation cells (lithium ion secondary batteries) were assembled in this manner. The evaluation cells were provided with a current cutoff mechanism that interrupts current flowing to the electrode assembly when the pressure inside the battery reaches a predetermined pressure or higher.

<Samples 1 to 11>

In Samples 1 to 10, evaluation cells were constructed while varying the content of CHB based on a value of 100% by mass for the total solid content of the positive electrode active material layer. More specifically, in Samples 1 to 10, the content of CHB throughout the entire positive electrode active material layer was varied within the range of 1% by mass to 8% by mass. Other conditions were the same. In addition, in Sample 11, a conventional conductive material not retaining CHB was used instead of the above-mentioned conductive material retaining CHB. In addition, CHB was added to the nonaqueous electrolyte at 4% by mass. Other conditions were the same as those of Samples 1 to 10.

<Measurement of Battery Capacity>

Each of the resulting evaluation cells of the above-mentioned Samples 1 to 11 were charged to a battery voltage of 4.1 V at a constant current of 1 C and in an atmosphere at 25° C. followed by charging to a charging current of 1/10 C at a constant voltage of 4.1 V. Then, the samples were charged to a voltage of 3.0 V at a constant current of 1 C and discharge capacity at that time of constant current discharge was defined as battery capacity. The results are shown in Table 1. Here, values are shown as relative values based on a value of 100 for the battery capacity of the battery of Sample 11.

<Discharge Characteristic Test>

Each of the resulting evaluation cells of the above-mentioned Samples 1 to 11 were charged to a battery voltage of 3.7 V at a constant current of 1 C and in an atmosphere at 25° C. followed by charging to a charging current of 1/10 C at a constant voltage of 3.7 V. Subsequently, the cells were allowed to discharge for 10 seconds at a constant current of 10 C. Discharge resistance was then calculated according to (voltage immediately before discharge–voltage after discharging for 10 seconds)/discharge current. The results are shown in the applicable columns of Table 1. Here, values are shown as relative values based on a value of 100 for the discharge resistance of the battery of Sample 11.

<Overcharge Test>

Each of the resulting evaluation cells of the above-mentioned Samples 1 to 11 were charged to a battery voltage of 4.1 V at a constant current of 1 C and in an atmosphere at 25° C. followed by charging to a charging current of 1/10 C at a constant voltage of 4.1 V (SOC: 100%). Subsequently, the batteries were charged at a constant current of 1 C to an overcharged state at an SOC of 160% followed by indicating those batteries in which the current cutoff mechanism operated with a "o" and indicating those in which the current cutoff mechanism did not operate with an "x". The results are shown in the applicable columns of Table 1.

TABLE 1

| Sample | CHB Content (wt %) | | Discharge Resistance | Battery Capacity | Overcharge Test Evaluation |
|---|---|---|---|---|---|
| | Positive Electrode Active Material layer | Electrolyte | | | |
| 1 | 0.1 | — | 81 | 100 | x |
| 2 | 0.2 | — | 79 | 99 | x |
| 3 | 0.3 | — | 80 | 101 | x |
| 4 | 0.4 | — | 81 | 100 | x |
| 5 | 0.5 | — | 82 | 101 | o |
| 6 | 0.6 | — | 81 | 100 | o |
| 7 | 1 | — | 80 | 99 | o |
| 8 | 2 | — | 79 | 97 | o |
| 9 | 4 | — | 81 | 96 | o |
| 10 | 8 | — | 82 | 93 | o |
| 11 | — | 4 | 100 | 100 | o |

As shown in Table 1, in the battery according to Sample 11, CHB was added to the electrolyte without being retained on the conductive material. In this Sample 11, although the current cutoff mechanism operated in the overcharge test, discharge resistance tended to increase in comparison with Samples 1 to 10. In contrast, in the batteries according to Samples 5 to 10, the conductive materials retained CHB and the content of CHB throughout the entire positive electrode active material layer was 0.5% by mass or more. In these Samples 5 to 10, the current cutoff mechanism operated appropriately in the overcharge test and an adequate amount of gas was generated. In addition, in comparison with Sample 11, in which CHB was added to the electrolyte without being retained on the conductive material, discharge resistance was lower and output characteristics were superior. On the basis of these results, a battery having high performance (low resistance) and superior stability was confirmed to be obtained by using a conductive material having CHB retained thereon and by making the content of CHB throughout the entire positive electrode active material layer to be 0.5% by mass or more.

In addition, when comparing Samples 5 to 10, battery capacity tended to decrease as the content of CHB throughout the entire positive electrode active material layer increased. In the case of the batteries used in this testing, an extremely high battery capacity of 96 or higher was able to be realized in comparison with Sample 11 by making the content of CHB throughout the entire positive electrode active material layer to be 4% by mass or less. On the basis of this result, the content of CHB throughout the entire positive electrode active material layer is preferably about 4% by mass or less and more preferably about 2% by mass or less.

Although the above has provided an explanation of a lithium ion secondary battery according to an embodiment of the present invention, the secondary battery according to the present invention is not limited to the above-mentioned embodiment, but rather can be modified in various ways.

What is claimed is:

1. A nonaqueous electrolyte secondary battery, comprising:
   an electrode assembly provided with a positive electrode in which a positive electrode active material layer is retained on a positive electrode current collector, a negative electrode in which a negative electrode active material layer is retained on a negative electrode current collector, and a separator interposed between the positive electrode and the negative electrode;
   a battery case housing the electrode assembly together with a nonaqueous electrolyte;
   an external terminal provided in the battery case and connected to the electrode assembly; and
   a current cutoff mechanism interrupting the electrical connection between the electrode assembly and the external terminal when internal pressure of the battery case reaches a predetermined pressure or higher, wherein
   the positive electrode active material layer includes a positive electrode active material and a conductive material,
   a compound containing a saturated cyclic hydrocarbon group is retained in at least a portion of the conductive material, the compound being chemically immobilized on a surface of the conductive material,
   the content of the compound retained in the conductive material is 0.5% by mass or more based on a value of 100% by mass for the total solid content of the positive electrode active material layer, and
   the compound is cycloalkylbenzene.

2. The nonaqueous electrolyte secondary battery according to claim 1, wherein the content of the compound retained in conductive material is 4% by mass or less based on a value of 100% by mass for the total solid content of the positive electrode active material layer.

3. The nonaqueous electrolyte secondary battery according to claim 1, wherein the compound is composed so as to allow protons to detach from the saturated cyclic hydrocarbon group when the voltage reaches a predetermined voltage or higher.

4. The nonaqueous electrolyte secondary battery according to claim 1, wherein the compound is cyclohexylbenzene.

5. The nonaqueous electrolyte secondary battery according to claim 1, wherein the nonaqueous electrolyte does not contain a gas generator that generates gas when the voltage reaches a predetermined voltage or higher.

6. The nonaqueous electrolyte secondary battery according to claim 1, wherein the conductive material is a carbon material.

7. The nonaqueous electrolyte secondary battery according to claim 6, wherein the carbon material is selected from the group consisting of carbon black, acetylene black, Ketjen black, furnace black, thermal black and graphite.

* * * * *